Patented Oct. 31, 1950

2,527,527

UNITED STATES PATENT OFFICE 2,527,527

METHYLENEDIOXY TERTIARY AMINES

Johannes S. Buck, Glenmont, and Chester M. Suter and Alexander R. Surrey, Albany, N. Y., assignors to Sterling Drug Inc., New York, N. Y., a corporation of Delaware No Drawing. Application October 14, 1948,
Serial No. 54,566

9 Claims. (Cl. 260—338)

This invention relates to pharmacologically active amines and to salts thereof. More particularly it relates to N-(alkoxylated-benzyl)-N-(lower alkyl)methylenedioxylated - phenethylamines and to addition salts thereof.

The compounds of our invention have the general formula

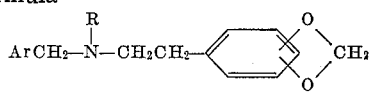

where R is a lower alkyl group and Ar is a member of the group consisting of

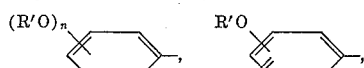

and

where R' is a lower alkyl group, $n$ is an integer from 1 to 3 inclusive, and Y is a methylenedioxy group. We have found these compounds to possess valuable pharmacological properties, especially for use in treating auricular fibrillation.

The compounds of our invention are further illustrated by the following specific examples.

(1) N - (4 - methoxybenzyl) - N - methyl - 3,4 - methylenedioxyphenethylamine

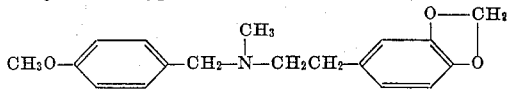

(2) N-(3,4,5-trimethoxybenzyl)-N-methyl-3,4-methylenedioxyphenethylamine

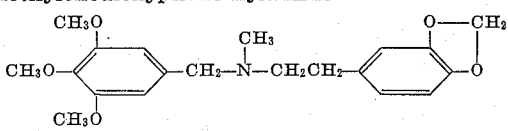

(3) N-(3-methoxy-4-ethoxybenzyl)-N-methyl-3,4-methylenedioxyphenethylamine

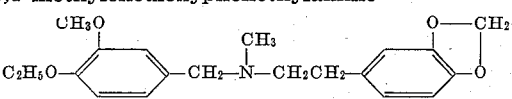

(4) N-(ethoxybenzyl) - N-methyl-2,3-methylenedioxyphenethylamine

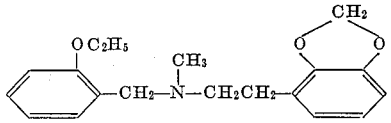

(5) N - (4 - n-propoxybenzyl) - N-methyl-3,4 - methylenedioxyphenethylamine

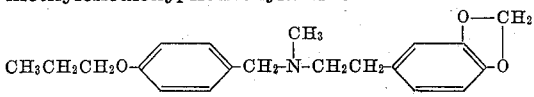

(6) N - (3,4 - dimethoxybenzyl) - N-ethyl-3,4 - methylenedioxyphenethylamine

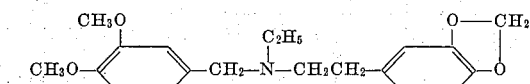

(7) N-(3,4-diethoxybenzyl)-N-(n-propyl)-3,4-methylenedioxyphenethylamine

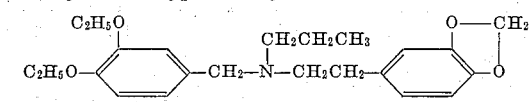

(8) N-(3-methoxy-4,5-methylenedioxybenzyl)-N-methyl-3,4-methylenedioxyphenethylamine

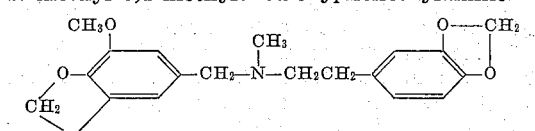

(9) N-(3,4-methylenedioxybenzyl) - N-methyl-3,4-methylenedioxyphenethylamine

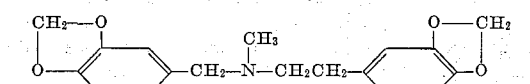

The compounds of our invention can be prepared by a variety of methods. One style of synthesis is illustrated by the following series of reactions:

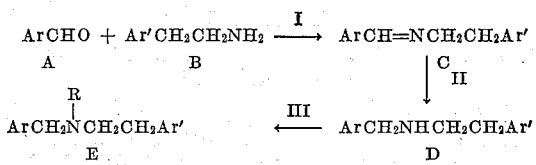

where Ar is alkoxylated-phenyl group as disclosed hereinabove, Ar' is a methylenedioxylated-phenyl group and R is a lower alkyl group, all of which have been described more fully hereinabove. In step I an aryl aldehyde, A, is condensed with a methylenedioxylated-phenethylamine, B, to yield the anil, C. Reduction of C in step II, yields the corresponding secondary amine, D, which, in step III is converted into the desired tertiary amine. Compounds represented by C and D are generally known as are methods of preparing them, including the steps represented by I and II. Step II can be carried out either by catalytic hydrogenation or by chemical reduction, e. g. use of sodium and ethanol. The secondary amine, D, also can be prepared by subjecting a reaction mixture of the compounds A and B to catalytic hydrogenation. Where R is methyl, step III is conveniently carried out using a mixture of formaldehyde and formic acid as the methylating agent (see Clarke et al., J. Am. Chem. Soc. 55, 4571 (1933)); where R is alkyl higher than methyl, other alkylating agents, such as alkyl halides, alkyl sulfates, etc. are used in step III.

Another means of preparing the secondary amines, designated as D above, is afforded by treating a benzyl halide (of the formula ArCH₂-halogen) with a phenethylamine (of the formula Ar'CH₂CH₂NH₂) or a phenethyl halide (of the formula Ar'CH₂CH₂-halogen) with a benzylamine (of the formula ArCH₂NH₂). Thus, N-(4-methoxybenzyl)-3,4-methylenedioxyphenethylamine is prepared by reacting either 4-methoxybenzyl chloride with 3,4-methylenedioxyphenethylamine or 4-methoxybenzylamine with 3,4-methylenedioxyphenethyl chloride. This general mode of synthesis is also applicable to the preparation of the tertiary amines represented by E. For example, N-(3-methoxybenzyl)-N-ethyl-3,4-methylenedioxyphenethylamine is prepared either by treating 3-methoxybenzyl chloride with N-ethyl-3,4-methylenedioxyphenethylamine or by treating N-ethyl-3-methoxybenzylamine with 3,4-methylenedioxyphenethyl chloride.

Thus, in summary, our new tertiary-amines which can be designated as $R^IR^{II}R^{III}N$ where one of the R's is a lower alkyl group, another of the R's is an alkoxylated-benzyl group and the remaining R is a methylenedioxylated-phenethyl group, are preparable from the corresponding secondary amine, $R^IR^{II}NH$, by alkylation or aralkylation, as the case may require.

The tertiary-amines of our invention are therapeutically active whether employed as the free bases, which are the active compounds, or as their salts with relatively non-toxic organic or inorganic acids. In practicing our invention we have found it convenient to isolate the tertiary-amines as their hydrochlorides, however, other salts are within the scope of our invention. Included among other acids which may be employed to form the salts are hydrobromic acid, phosphoric acid, sulfuric acid, sulfamic acid, tartaric acid, citric acid, succinic acid, acetic acid, benzoic acid, oleic acid, and the like.

The following examples will further illustrate specific embodiments of the invention.

EXAMPLES

I. *N-(alkoxylated-benzyl)-methylenedioxylated-phenethylamines*

In practicing our invention we prepared the intermediate secondary amines represented as D above from the appropriate benzaldehyde derivative (A) and a methylenedioxylated-phenethylamine (B). The anil, C, is formed when A and B are either heated on a steam bath for about 5 to 60 minutes or allowed to stand at room temperature overnight. The following preparations are illustrative.

A. *N - (3,4 - methylenedioxybenzyl) - 3,4-methylenedioxyphenethylamine hydrochloride.*— A mixture of 5.5 g. of 3,4-methylenedioxyphenethylamine and 5 g. of 3,4-methylenedioxybenzaldehyde was warmed on a steam bath for a few minutes until the solid anil formed. After recrystallization from ethanol the anil melted at 115–116° C. About 3 g. of the anil was dissolved in 100 ml. of hot ethanol and hydrogenated catalytically using palladium-charcoal. After filtering off the catalyst, ethanolic hydrogen chloride was added, and the resulting hydrochloride was recrystallized from water. This salt, N-(3,4-methylenedioxybenzyl) - 3,4 - methylenedioxyphenethylamine hydrochloride, melted at 245–246.2° C. (corr.).

When the above procedure is carried out using the appropriate alkoxylated-benzaldehydes and methylenedioxylated-phenethylamines, the following secondary amine salts are obtained: N-(3,4,5 - trimethoxybenzyl) - 3,4 - methylenedioxyphenethylamine hydrochloride; N-(3-ethoxybenzyl)-2,3-methylenedioxyphenethylamine hydrochloride; and N-(3-methoxy-4,5-methylenedioxybenzyl) - 3,4 - methylenedioxyphenethylamine hydrochloride.

B. *N - (3 - methoxybenzyl) - 3,4 - methylenedioxyphenethylamine hydrochloride.*—A mixture of 5.5 g. of 3,4-methylenedioxyphenethylamine and 4.6 g. of 3-methoxybenzaldehyde was allowed to stand overnight, dissolved in 100 ml. of ethanol, and hydrogenated and worked up as in the previous example (I—A). The product, N-(3-methoxybenzyl) - 3,4 - methylenedioxyphenethylamine hydrochloride, melted at 160–161.4° C. (corr.) after having been recrystallized from isopropanol.

Using the appropriate reactants and the hereinbefore described procedures (I—A and I—B) there were prepared N-(4-methoxybenzyl)-3,4-methylenedioxyphenethylamine hydrochloride, M. P. 248–249° C. and N-(3,4-dimethoxybenzyl)-3,4-methylenedioxyphenethylamine hydrochloride, M. P. 205.5–206° C.

II. *N-(alkoxylated-benzyl)-N-(lower alkyl)-methylenedioxylated-phenethylamines*

These tertiary amines where lower alkyl is methyl are readily prepared by methylating the corresponding secondary amines described under procedure I above with 35–40% aqueous formaldehyde and 90–100% of formic acid. The examples A and B that follow are representative of this methylation.

A. *N - (3,4 - methylenedioxybenzyl) - N - methyl - 3,4 - methylenedioxyphenethylamine hydrochloride.*—4.4 g. of N-(3,4-methylenedioxybenzyl)-3,4-methylenedioxyphenethylamine hydrochloride was converted into the corresponding base by treating the salt with aqueous sodium hydroxide, extracting the liberated basic amine with ether, drying the extract, and removing the ether. The resulting secondary amine was treated with 1.5 g. of 98–100% formic acid and 1.65 g. of 35–40% aqueous formaldehyde solution. The resulting mixture was heated on a steam bath for six hours, cooled, made alkaline with 35% aqueous sodium hydroxide solution, and extracted with ether. The extract was dried over anhydrous calcium sulfate and treated with approximately an equivalent amount of ethanolic-hydrogen chloride to yield about 3.5 g. of N-(3,4 - methylenedioxybenzyl) - N - methyl - 3,4-methylenedioxyphenethylamine hydrochloride, M. P. 205.6–206.6° C. (corr.).

When in the above procedure there is used as the secondary amine N-(3,4,5-trimethoxybenzyl)-3,4-methylenedioxyphenethylamine, N-(3-ethoxybenzyl) - 2,3 - methylenedioxyphenethylamine, or N-(3-methoxy-4,5-methylenedioxybenzyl)-3,4-methylenedioxyphenethylamine, the resulting product obtained is, respectively, N-(3,4,5-trimethoxybenzyl) - N - methyl - 3,4 - methylenedioxyphenethylamine hydrochloride, N-(3-ethoxybenzyl) - N - methyl - 2,3 - methylenedioxyphenethylamine hydrochloride, or N-(3-methoxy - 4,5 - methylenedioxybenzyl) - N - methyl-3,4-methylenedioxyphenethylamine hydrochloride.

B. *N-(3 - methoxybenzyl) - N - methyl - 3,3-methylenedioxyphenethylamine hydrochloride.*—This preparation was carried out like that described hereinabove as example II-A except the reactants were N-(3-methoxybenzyl)-3,4-methylenedioxyphenethylamine (obtained from 7.0 g. of the corresponding hydrochloride), 2.5 g. of 98–100% formic acid and 2.75 g. of 35–40% aqueous formaldehyde, and the reaction time was 15 hours. The product, N-(3-methoxybenzyl)-N-methyl-3,4-methylenedioxyphenethylamine hydrochloride, melted at 160–161.4° C., after having been recrystallized from isopropanol.

Other compounds prepared according to the above procedures (II—A and II—B), using the appropriate N-(alkoxylated-benzyl) - 3,4 - methylenedioxyphenethylamine include N-(4-methoxybenzyl) - N - methyl - 3,4 - methylenedioxyphenethylamine hydrochloride, M. P. 182.4–183.2° C. (corr.) and N-(3,4-dimethoxybenzyl)-N-methyl-3,4-methylenedioxyphenethylamine hydrochloride, M. P. 180–181° C. (corr.).

The tertiary amines of our invention where the lower alkyl group designated hereinabove as R is greater than methyl are prepared by using other alkylating agents such as alkyl halides, e. g. n-propyl bromide; alkyl sulfates, e. g. ethyl sulfate; and the like. Thus, when the secondary amine is N-(3,4-dimethoxybenzyl)-3,4-methylenedioxyphenethylamine and the alkylating agent is n-propyl bromide or ethyl sulfate, the resulting product is N-(3,4-dimethoxybenzyl)-N-n-propyl-3,4-methylenedioxyphenethylamine hydrochloride or N-(3,4-dimethoxybenzyl)-N-ethyl-3,4-methylenedioxyphenethylamine hydrochloride, respectively.

We claim:

1. A compound having the formula

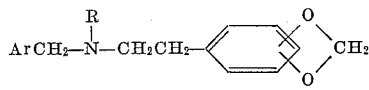

where R is a lower alkyl group and Ar is a member of the group consisting of

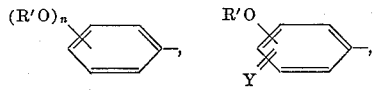

and

where R' is a lower alkyl group, $n$ is an integer from 1 to 3 inclusive and Y is a methylenedioxy group, and addition salts thereof.

2. A compound having the formula

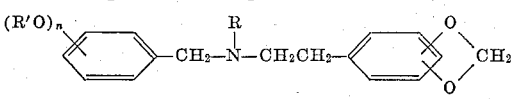

where R and R' are lower alkyl groups and $n$ is an integer from 1 to 3 inclusive, and addition salts thereof.

3. A compound having the formula

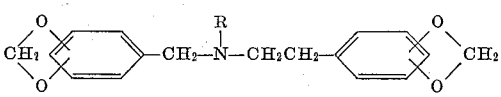

where R is a lower alkyl group, and addition salts thereof.

4. A compound having the formula

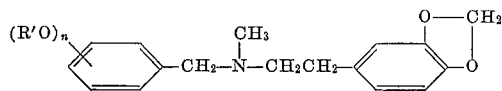

where R' is a lower alkyl group and $n$ is an integer from 1 to 3 inclusive, and addition salts thereof.

5. A compound having the formula

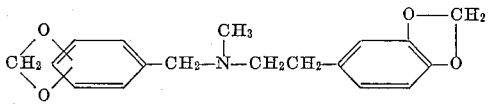

and addition salts thereof.

6. N - (3 - methoxybenzyl) - N - methyl - 3,4-methylenedioxyphenethylamine, and addition salts thereof.

7. N - (4 - methoxybenzyl) - N - methyl - 3,4-methylenedioxyphenethylamine, and addition salts thereof.

8. N - (3,4 - dimethoxybenzyl) - N - methyl-3,4-methylenedioxyphenethylamine, and addition salts thereof.

9. N - (3,4 - methylenedioxybenzyl) - N - methyl-3,4-methylenedioxyphenethylamine, and addition salts thereof.

JOHANNES S. BUCK.
CHESTER M. SUTER.
ALEXANDER R. SURREY.

REFERENCES CITED

The following references are of record in the file of this patent:

FOREIGN PATENTS

| Number | Country | Date |
|---|---|---|
| 273,323 | Germany | Jan. 23, 1913 |